United States Patent
Lim et al.

(10) Patent No.: US 11,543,540 B2
(45) Date of Patent: Jan. 3, 2023

(54) APPARATUS AND METHOD OF SELECTING AIRBORNE POSITION REFERENCE NODE

(71) Applicants: AGENCY FOR DEFENSE DEVELOPMENT, Daejeon (KR); AJOU UNIVERSITY INDUSTRY-ACADEMIC COOPERATION FOUNDATION, Gyeonggi-do (KR)

(72) Inventors: Jae Sung Lim, Gyeonggi-do (KR); Ho Ki Baek, Gyeonggi-do (KR); Jin Seok Lee, Gyeonggi-do (KR); Kyung Woo Kim, Daejeon (KR); Jae Hyun Ham, Daejeon (KR)

(73) Assignees: AGENCY FOR DEFENSE DEVELOPMENT, Daejeon (KR); AJOU UNIVERSITY INDUSTRY-ACADEMIC COOPERATION FOUNDATION, Gyeonggi-Do (KR)

( * ) Notice: Subject to any disclaimer, the term of this patent is extended or adjusted under 35 U.S.C. 154(b) by 156 days.

(21) Appl. No.: 17/001,684

(22) Filed: Aug. 25, 2020

(65) Prior Publication Data
US 2021/0063582 A1 Mar. 4, 2021

(30) Foreign Application Priority Data
Aug. 26, 2019 (KR) .......................... 10-2019-0104572

(51) Int. Cl.
*G01S 19/29* (2010.01)
*G01S 19/25* (2010.01)

(52) U.S. Cl.
CPC ............ *G01S 19/29* (2013.01); *G01S 19/252* (2013.01)

(58) Field of Classification Search
CPC .............................. G01S 19/29; G01S 19/252
USPC ...... 342/453, 55, 22; 345/582, 441, 586, 588
See application file for complete search history.

(56) References Cited

U.S. PATENT DOCUMENTS

| 11,118,917 B2* | 9/2021 | Grandl | ............... G01C 21/3826 |
| 2013/0045750 A1* | 2/2013 | Kim | .......................... G01S 5/14 |
| | | | 455/456.1 |

FOREIGN PATENT DOCUMENTS

| KR | 10-1762510 | 7/2017 |
| KR | 10-1857361 | 6/2018 |
| KR | 10-1947897 | 2/2019 |

\* cited by examiner

*Primary Examiner* — Bo Fan
(74) *Attorney, Agent, or Firm* — Ladas & Parry, LLP

(57) ABSTRACT

Provided is a method and apparatus for selecting an airborne position reference node. A weight center coordinate of the repeaters is calculated by using position coordinates of repeaters, a plane having a vector connecting the weight center coordinate and a position coordinate of a user as a normal vector is determined, and the position coordinates of the repeaters are orthographically projected onto the plane. A certain number of repeaters located farthest from the weight center coordinate of the repeaters are selected to be airborne position reference nodes, on the basis of the orthographically projected coordinates of the repeaters and the weight center coordinate.

13 Claims, 5 Drawing Sheets

APPARATUS AND METHOD OF SELECTING AIRBORNE POSITION REFERENCE NODE

CROSS-REFERENCE TO RELATED APPLICATION

This application claims the benefit of Korean Patent Application No. 10-2019-0104572, filed on Aug. 26, 2019, in the Korean Intellectual Property Office, the disclosure of which is incorporated herein in its entirety by reference.

BACKGROUND

1. Field

The disclosure relates to an apparatus and method of selecting an airborne position reference node.

2. Description of Related Art

Many users receive positioning services through a global navigation satellite system (GNSS). However, in GNSS shadow areas such as mountainous areas, the positioning services may not be provided due to the weak intensity of a GNSS signal. In this case, the positioning service may be received using alternative satellite navigation through an airborne position reference node.

In the positioning, navigation, and timing (PNT) technology of GNSS and alternative satellite navigation, a user needs four or more navigation signals to obtain time sync and position information. When a user receives signals from repeaters, the user may determine his/her position by selecting four signals from the received signals and received a positioning service.

However, compared with the GNSS, air-based alternative satellite navigation may have relatively low configuration costs and may be easy to operate so that a large number of repeaters may be operated. When the number of repeaters being operated increases, the number of signals of repeaters to be received by a user increases. Accordingly, the amount of calculation to reduce a position error increases, thereby generating load. When the amount of calculation increases, a processing speed may be reduced because calculation is continuously performed for a moving user.

Furthermore, as accuracy of a positioning service that the user receives varies according to the repeaters selected as airborne position reference nodes, an algorithm for selecting a repeater to improve the quality of a service is necessary. Furthermore, as the amount of calculation of a user is further increased in an environment in which the position of the repeater is quickly changed, necessity of quickly selecting an airborne position reference node has increased.

PRIOR ART DOCUMENTS

Registered Korean Patent: KR 10-1947897 B1 (Registration date: 2019 Feb. 7)

SUMMARY

Provided is an apparatus and method of selecting an airborne position reference node.

Additional aspects will be set forth in part in the description which follows and, in part, will be apparent from the description, or may be learned by practice of the presented embodiments of the disclosure.

According to an aspect of the disclosure, a method of selecting an airborne position reference node includes obtaining position coordinates of repeaters and position coordinate of a user, calculating a weight center coordinate of the repeaters by using the position coordinates of the repeaters, determining a plane having a vector connecting the weight center coordinate of the repeaters and the position coordinate of the user as a normal vector, orthographically projecting the position coordinates of the repeaters onto the plane, and selecting a certain number of repeaters located farthest from the weight center coordinate of the repeaters to be airborne position reference nodes, on the basis of the orthographically projected coordinates of the repeaters and the weight center coordinate of the repeaters.

Furthermore, the selecting the certain number of the repeaters located farthest from the weight center coordinate of the repeaters to be the airborne position reference nodes may include setting a plurality of direction vectors on the plane to divide the plane into a plurality of sections, determining a section to which each of the repeaters belongs by performing outer product on the plurality of direction vectors adjacent to each other, and selecting, in each of the plurality of sections, the certain number of repeaters located farthest from the weight center coordinate of the repeaters to be the airborne position reference nodes, on the basis of the orthographically projected coordinates of the repeaters and the weight center coordinate of the repeaters.

Furthermore, the selecting the certain number of the repeaters located farthest from the weight center coordinate of the repeaters to be the airborne position reference nodes may include selecting, in each of the plurality of sections, the certain number of repeaters located farthest from the weight center coordinate of the repeaters to be airborne position reference nodes, on the basis of the coordinates of the repeaters before the orthographic projection and the weight center coordinate of the repeaters.

Furthermore, the selecting the certain number of the repeaters located farthest from the weight center coordinate of the repeaters to be the airborne position reference nodes may include selecting four repeaters located farthest from the weight center coordinate of the repeaters to be airborne position reference nodes.

Furthermore, the setting of the plurality of direction vectors may include setting four direction vectors on the plane to divide the plane into quadrants.

Furthermore, the setting of the plurality of direction vectors may include setting a reference point on the plane and setting a reference direction vector connecting the weight center coordinate of the repeaters and the reference point, obtaining (number of sections—1) additional direction vectors by rotating the reference direction vector around the weight center coordinate of the repeaters as an axis, by $2\pi/$(number of sections) each, and setting the reference direction vector and the additional direction vectors to be the plurality of direction vectors on the plane.

Furthermore, the calculating of the weight center coordinate may include setting the weight center coordinate to be the origin.

According to another aspect of the disclosure, an apparatus for selecting an airborne position reference node includes a communicator configured to receive position coordinates of repeaters and a position coordinate of a user, and a controller configured to calculate a weight center coordinate of the repeaters by using the position coordinates of repeaters, determine a plane having a vector connecting the weight center coordinate of the repeaters and the position coordinate of a user as a normal vector, orthographically project the position coordinates of the repeaters onto the plane, and select a certain number of repeaters located farthest from the weight center coordinate of the repeaters to be airborne position reference nodes, on the basis of the orthographically projected coordinates of the repeaters and the weight center coordinate of the repeaters.

According to another aspect of the disclosure, there is provided a non-transitory computer-readable recording medium having recorded thereon a program for executing, on a computer, the above method.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
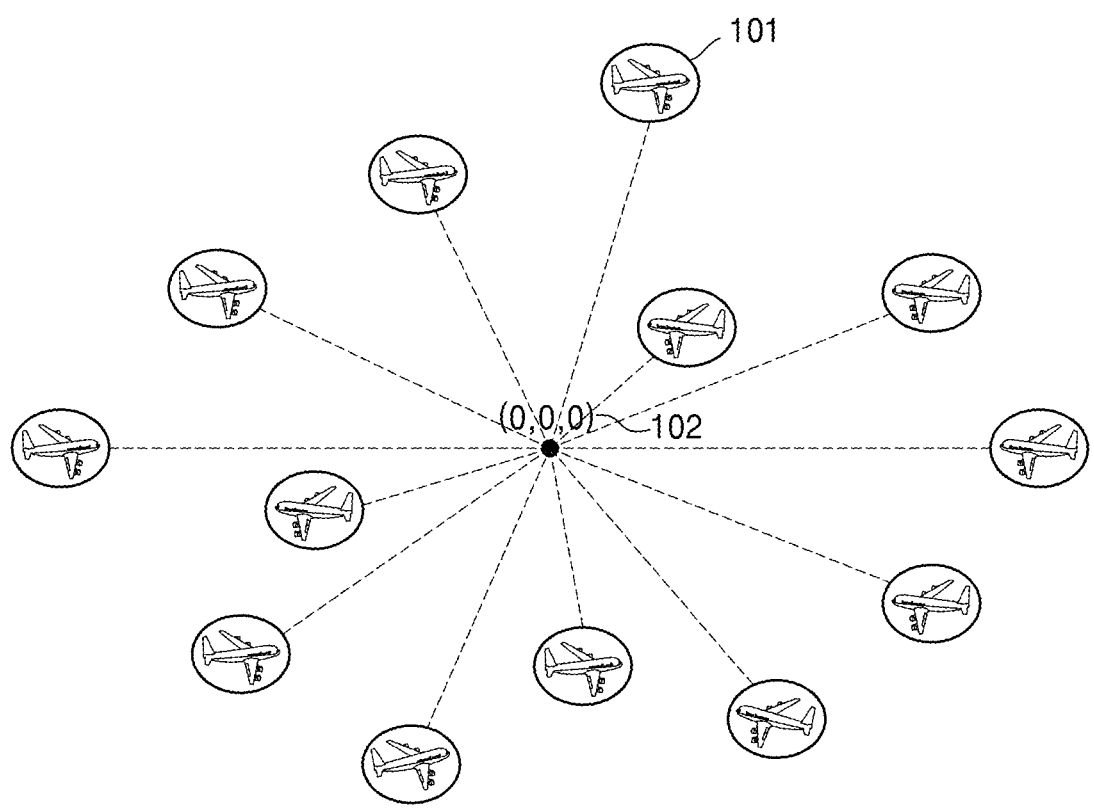
FIG. 1 illustrates an example of calculating a weight center of repeaters, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Expressions such as "in some embodiments" or "in an embodiment" appearing in various places in the specification do not necessarily indicate the same embodiment.

Some embodiments of the disclosure may be described in terms of functional block components and various processing steps. Some or all of the functional blocks may be realized by various numbers of hardware and/or software components configured to perform specified functions. For example, the functional blocks of the disclosure may be realized by one or more microprocessors or by circuit components for specified functions. Furthermore, the functional blocks of the disclosure may be implemented with any programming or scripting language. The functional blocks may be implemented in algorithms that are executed on one or more processors. Furthermore, the disclosure could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc. Furthermore, terms such as "~portion", "~unit", "~module", and "—block" stated in the specification may signify a unit to process at least one function or operation and the unit may be embodied by hardware, software, or a combination of hardware and software.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

In the following description, embodiments of the disclosure are described in detail with reference to the accompanying drawings.

FIG. 1 illustrates an example of calculating the weight center of repeaters, according to an embodiment.

FIG. 1 illustrates n repeaters 101, where n is a natural number, located in the air.

In the positioning, navigation, and timing (PNT) technology of alternative satellite navigation, four or more navigation signals are necessary for obtaining time sync and position information about a user.

The number of cases of selecting four repeaters of the n repeaters 101 of FIG. 1, as airborne position reference nodes, may be expressed by Equation 1 below.

$$nC_4 = (n*(n-1)*(n-2)*(n-3)) \quad \text{[Equation 1]}$$

However, as the number of cases of selecting the n repeaters 101 is much greater than an increasing speed of the number (n) of the n repeaters 101, calculating all numbers of cases greatly increase complexity. In other words, when all numbers of cases are considered, time complexity is $O(n^4)$ so that the amount of calculation is much increased. In the following description, a method of efficiently selecting four repeaters of the n repeaters 101 as airborne position reference nodes without much increasing the amount of calculation is described.

Referring to FIG. 1, the coordinates of the n repeaters 101 may be expressed as three-dimensional coordinates (x, y, z). An apparatus may calculate a weight center 102 of the n repeaters 101 by obtaining an average by adding the same component in the coordinates of the n repeaters 101.

In an embodiment, the apparatus may set the weight center 102 with respect to the n repeaters 101 to be the origin (0, 0, 0).

Figure 2:
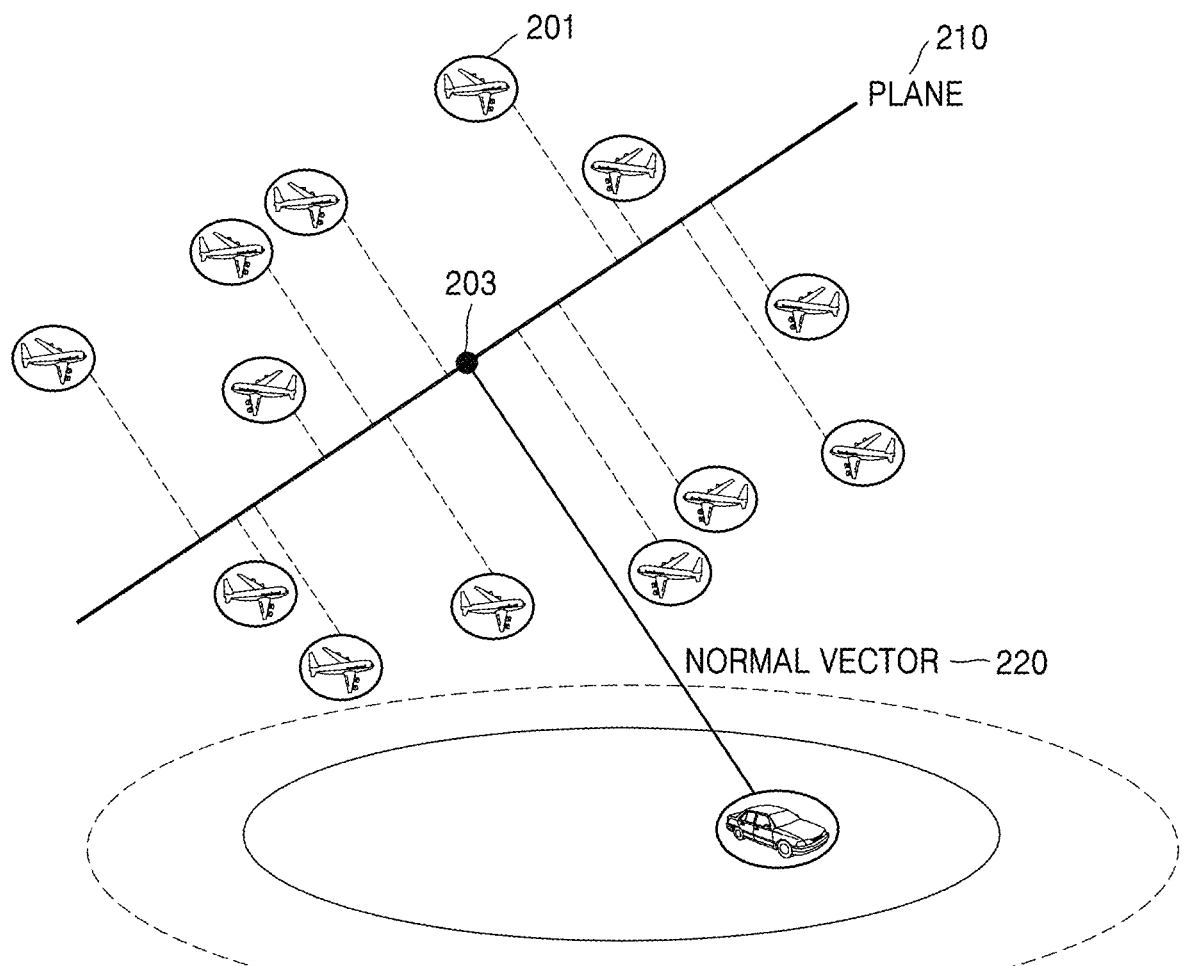
FIG. 2 illustrates an example of orthographic projection of coordinates of repeaters, according to an embodiment.

FIG. 2 illustrates an example of orthographic projection of coordinates of repeaters, according to an embodiment.

Referring to FIG. 2, the apparatus may calculate a weight center 203 by using three-dimensional coordinates of n repeaters 201. Furthermore, the apparatus may obtain a coordinate of a user 202.

The apparatus may determine a vector connecting the weight center 203 and the coordinate of the user 202 to be a normal vector 220. Furthermore, the apparatus may determine a plane 210 based on the normal vector 220.

For example, when the weight center 203 is expressed by the origin (0, 0, 0) and the coordinate of the user 202 is expressed by (a, b, c), a vector $\vec{u}$ connecting two points may be expressed by Equation 2.

$$\vec{u} = (a, b, c) \quad \text{[Equation 2]}$$

Furthermore, an equation of the plane 210 having the vector $\vec{u}$ as the normal vector 220 may be expressed by Equation 3 below.

$$ax + by + cz = 0 \quad \text{[Equation 3]}$$

When the coordinates of the n repeaters 201 are orthographically projected onto the plane 210 according to Equation 3, the coordinates of the repeaters 201 that are orthographically projected may be expressed by Equation 4 below.

$$a_i = (x_i, y_i, z_i)(1 \leq i \leq n)$$ [Equation 4]

When the coordinates of the n repeaters 201 are orthographically projected onto the plane 210 according to Equation 3, the n repeaters 201 are all located on the plane 210 that is single.

As dilution of precision (DOP) is inversely proportional to the volume of a tetrahedron formed by airborne position reference nodes, DOP may be expressed as one obtaining the volume of a tetrahedron by using a vector. The repeaters 201 spaced far from one another are selected to select airborne position reference nodes among the n repeaters 201 so as to increase the volume of a tetrahedron.

Accordingly, among the n repeaters 201 that are orthographically projected onto the plane 210, the apparatus may determine a certain number of the repeaters 201 located farthest from the weight center 203 to be airborne position reference nodes. For example, the apparatus may determine four repeaters 201 that are located farthest from the weight center 203 to be airborne position reference nodes.

Figure 3:
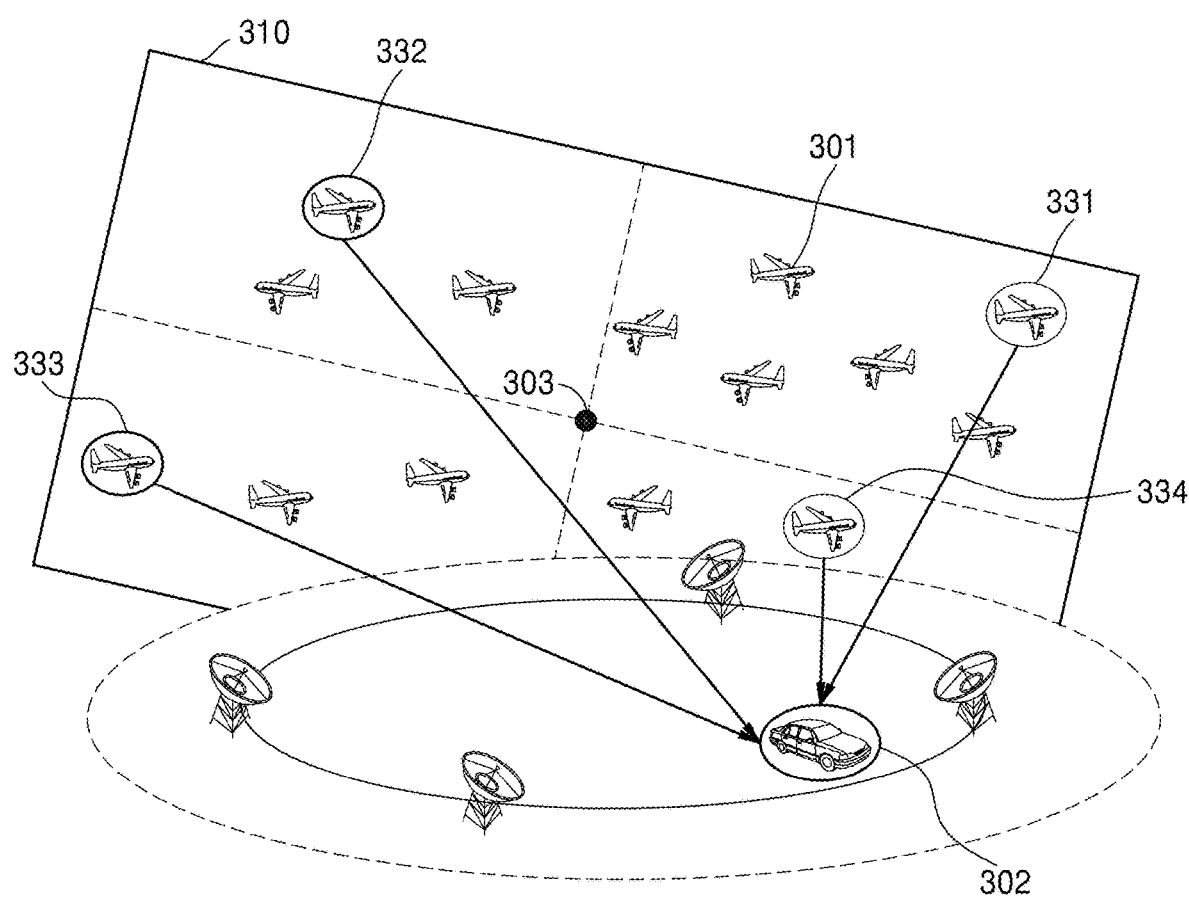
FIG. 3 illustrates a method of selecting an airborne position reference node by dividing a plane into a plurality of sections, according to an embodiment.

FIG. 3 illustrates a method of selecting an airborne position reference node by dividing a plane into a plurality of sections, according to an embodiment.

The apparatus may divide a plane 310 into a plurality of sections. For example, the apparatus may divide the plane 310 into four or more sections.

In detail, the apparatus may set a reference point on the plane 310 other than a weight center 303 to divide the plane 310 into a plurality of sections. The apparatus may set a reference direction vector connecting the weight center 303 and the reference point. Furthermore, the apparatus may obtain (number of sections—1) number of additional direction vectors by rotating the reference direction vector by "$2\pi$/(number of sections)" each around the weight center 303 as an axis.

For example, when the equation of the plane 310 is expressed as in Equation 3, the reference direction vector may be expressed as in Equation 5.

$$\vec{G} = (1, 1, Z)$$ [Equation 5]

Furthermore, when the number of sections is k, the additional direction vectors generated by rotating a reference direction vector $\vec{G}$ by "$2\pi/k$" each may be obtained. In other words, when the number of sections is k, one reference direction vector $\vec{G}$ and (k−1) number of additional direction vectors may be obtained.

The apparatus may determine a section to which each of the repeaters 310 belongs by performing output product on direction vectors adjacent to each other among the reference direction vector and the additional direction vectors.

When the section to which each of the repeaters 301 belongs is determined, the apparatus may select a certain number of the repeaters 301 located farthest from the weight center 303, as airborne position reference nodes 331 to 334, in each of a plurality of sections, on the basis of the orthographically projected coordinate of the repeaters 301 and the weight center 303.

Referring to FIG. 3, the plane 310 is divided into quadrants by direction vectors. The apparatus may determine a quadrant to which each of the repeaters 301 belongs. When the quadrant to which each of the repeaters 301 belongs is determined, the apparatus may select the repeaters 301 located farthest from the weight center 303 to be the airborne position reference nodes 331 to 334, for each quadrant.

When the four repeaters 301 located farthest from the weight center 303 are closely gathered, as DOP is small, a plane may be divided into quadrants or more so that four nodes located in different sections may be selected.

In an embodiment, when it is difficult to determine the repeater 301 located farthest from the weight center 303 because the repeaters 301 are closely gathered on a plane at positions far from the weight center 303, the apparatus may use the coordinates of the repeaters 301 before the orthographic projection.

The apparatus may select the four repeaters 301 located farthest from the weight center 303 as the airborne position reference nodes 331 to 334 on the basis of the coordinates of the repeaters 301 before the orthographic projection and the weight center 303.

Figure 4:
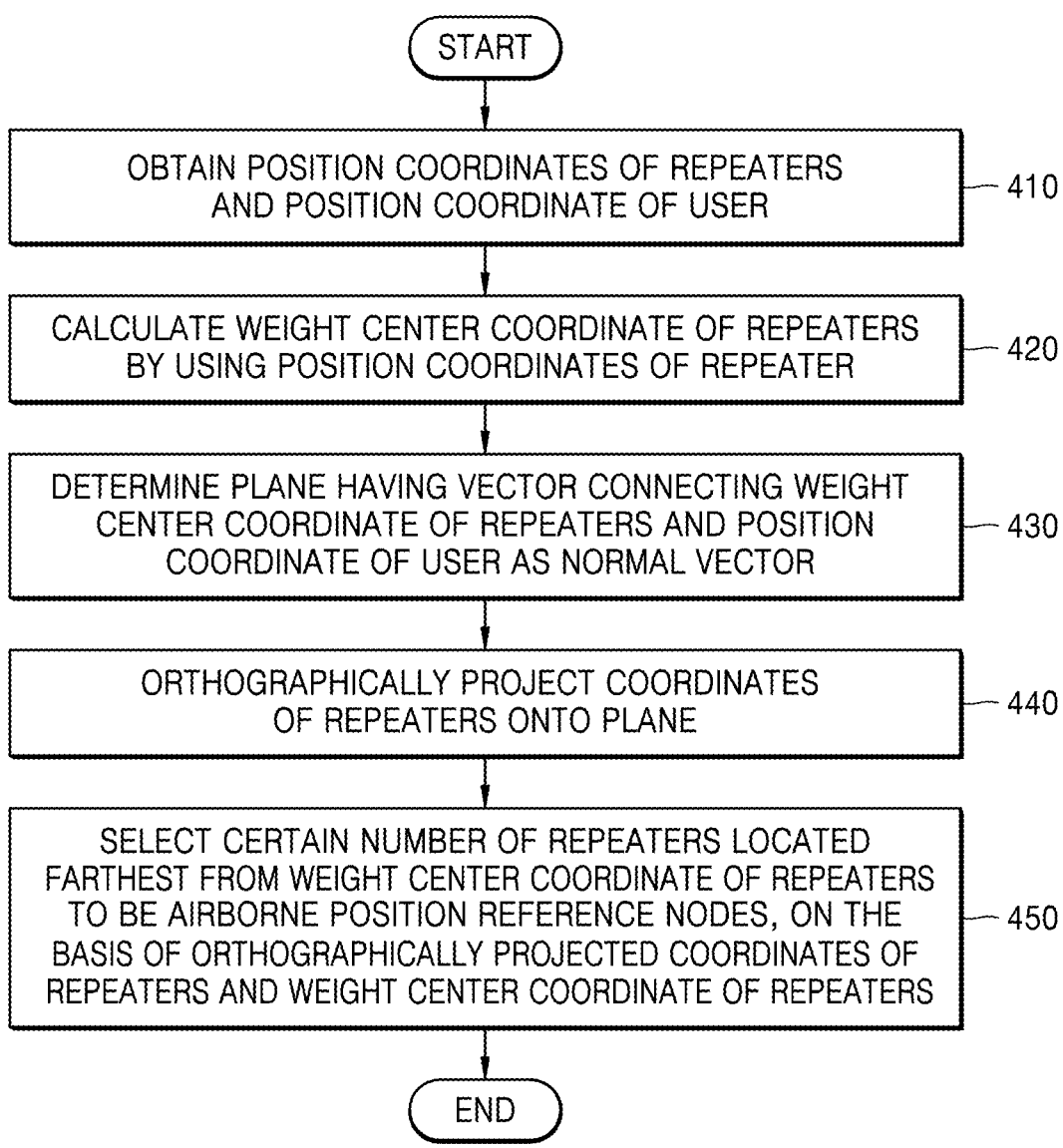
FIG. 4 is a flowchart of a method of selecting an airborne position reference node, according to an embodiment.

FIG. 4 is a flowchart of a method of selecting an airborne position reference node, according to an embodiment.

Referring to FIG. 4, in operation 410, the apparatus may obtain position coordinates of repeaters and a position coordinate of a user.

The position coordinates of repeaters and the position coordinate of a user are three-dimensional coordinates (x, y, z), and the apparatus may obtain the three-dimensional coordinates from the repeaters and the user.

In operation 420, the apparatus may calculate a weight center coordinate of the repeaters by using the position coordinates of the repeaters.

In an embodiment, when the apparatus obtains position coordinates of a total of n repeaters, the apparatus may calculate the weight center of the n repeaters by obtaining an average by adding the same components in the coordinates of n repeaters. For example, the apparatus may set the weight center coordinate to be the origin (0, 0, 0).

In operation 430, the apparatus may determine a plane that has a vector connecting the weight center coordinate of the repeaters and the position coordinate of a user as a normal vector.

For example, when the weight center coordinate is expressed as the origin (0, 0, 0), and the coordinate of a user is expressed as (a, b, c), the normal vector may be expressed as in Equation 2. Furthermore, an equation of a plane having the vector according to Equation 2 as a normal vector may be expressed by Equation 3.

In operation 440, the apparatus may orthographically project the coordinates of the repeaters onto the plane.

For example, when the coordinates of n repeaters are orthographically projected onto the plane according to Equation 3, the coordinates of the orthographically projected repeaters may be expressed by Equation 4.

In operation 450, the apparatus may select a certain number of repeaters located farthest from the weight center coordinate of the repeaters to be airborne position reference nodes, on the basis of the orthographically projected coordinates of the repeaters and the weight center coordinate of the repeaters.

In an embodiment, the apparatus may select the airborne position reference nodes by dividing the plane into a plurality of sections.

In detail, the apparatus may set a plurality of direction vectors on the plane to divide the plane into a plurality of sections. To set a plurality of direction vectors, the apparatus may set a reference point on the plane and then a reference direction vector connecting the weight center coordinate of the repeaters and the reference point. Furthermore, the apparatus may obtain (number of sections−1) additional direction vectors by rotating the reference direction vector around the weight center coordinate of the repeaters as an axis, by "2π/(number of sections)" each. Accordingly, the apparatus may set the reference direction vector and the additional direction vectors to be a plurality of direction vectors on the plane.

For example, the apparatus may set four direction vectors on the plane to divide the plane into quadrants.

After setting a plurality of direction vectors, the apparatus may determine a section to which each of the repeaters belongs, by performing outer product on direction vectors adjacent to each other.

In each of a plurality of sections, the apparatus may select a certain number of repeaters located farthest from the weight center coordinate of the repeaters to be airborne position reference nodes, on the basis of the orthographically projected coordinates of the repeaters and the weight center coordinate of the repeaters.

For example, the apparatus may select four repeaters located farthest from the weight center coordinate of the repeaters to be airborne position reference nodes.

In an embodiment, when it is difficult to determine a repeater located farthest from the weight center because a plurality of repeaters are densely located on a plane at positions far from the weight center, the apparatus may use coordinates of the repeaters before the orthographic projection.

The apparatus, in each of a plurality of sections, may select a certain number of repeaters located farthest from the weight center coordinate of the repeaters to be airborne position reference nodes, on the basis of the coordinates of the repeaters before the orthographic projection and the weight center coordinate of the repeaters.

The apparatus, in response to a signal received from the selected airborne position reference node, may provide a user with time information, position information, or the like.

When the positions of at least some of the user and/or repeaters are changed, the apparatus may continuously provide a user with time information, position information, or the like, by repeating the above process.

When the airborne position reference nodes are selected through the above-described process, as N2 times of operations are performed on the orthographic projection, maximum N2 times of operations on dividing a plane into sections, and N2 times of operations on finding repeaters located farthest from the weight center, time complexity is $O(n^2)$. In other words, the time complexity $O(n^2)$ of the method of selecting an airborne position reference node according to the disclosure is less than the time complexity $O(n^4)$ using the related art.

Figure 5:
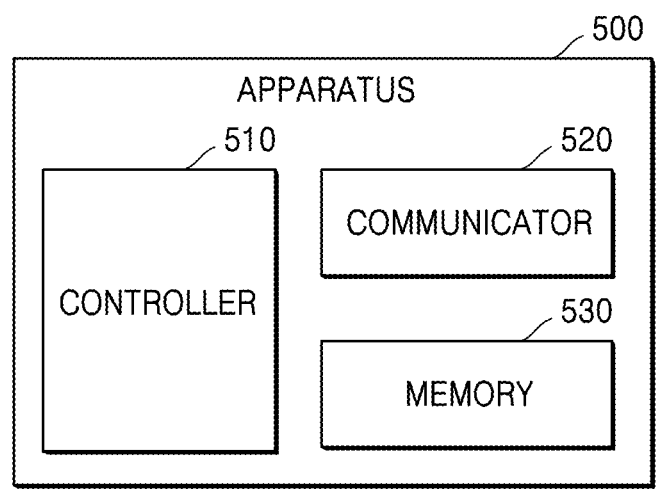
FIG. 5 is a block diagram of a hardware configuration of an apparatus for selecting an airborne position reference node, according to an embodiment.

FIG. 5 is a block diagram of a hardware configuration of an apparatus for selecting an airborne position reference node, according to an embodiment.

Referring to FIG. 5, an apparatus 500 may include a controller 510, a communicator 520, and a memory 530. In FIG. 5, the apparatus 500 is illustrated to include only constituent elements related to the embodiment. Accordingly, it would be understood by a person skilled in the art that general purpose constituent elements other than the constituent elements illustrated in FIG. 5 may be further included The apparatus 500 may be implemented by various types of devices such as a personal computer (PC), a server device, a mobile device, an embedded device, or the like.

The controller 510 may control a series of the processes to select an airborne position reference node, which are described in FIGS. 1 to 4. The controller 510 may control overall functions to control the apparatus 500. For example, the controller 510 generally controls the apparatus 500 by executing programs stored in the memory 530 of the apparatus 500. The controller 510 may be implemented by a central processing unit (CPU), a graphics processing unit (GPU), an application processor (AP), or the like, which are provided in the apparatus 500, but the disclosure is not limited thereto.

The communicator 520 may include a short-range communicator, a mobile communicator, and a broadcast receiver. The communicator 520 may receive the position coordinates of repeaters and the position coordinate of a user.

The memory 530, which is hardware for storing various pieces of data processed in the apparatus 500, may store, for example, the position coordinates of repeaters and the position coordinate of a user received from the communicator 520, data related to vital signals of a pilot during flight and in a flight suitable state, or pieces of data processed or to be processed in the apparatus 500. Furthermore, the memory 530 may store applications, drivers, or the like to be driven by the apparatus 500. The memory 530 may include random access memory (RAM) such as dynamic random access memory (DRAM), static random access memory (SRAM), or the like, read-only memory (ROM), electrically erasable programmable read-only memory (EEPROM), CD-ROM, Blu-ray or other optical disc storage, hard disk drive (HDD), solid state drive (SSD), or flash memory.

The embodiments of the disclosure may be embodied in the form of an application stored in a recording medium that is readable by an electronic device and stores instructions and data executed by an electronic device. The instructions may be stored in the form of a program code, and when executed by a processor, may perform a certain operation by generating a certain program module. Furthermore, the instructions, when executed by a processor, may perform certain operations of the disclosed embodiments.

The embodiments may be implemented in the form of a recording medium including instructions that are executable by a computer, such as a program module executed by a computer. A computer-readable storage medium may be a useable medium that is accessible by a computer and may include all of volatile and non-volatile media and separable and inseparable media. Furthermore, the computer-readable medium may include all of computer storage media and communication media. The computer storage media may include all of volatile and non-volatile media and separable and inseparable media, which are embodied by a certain method or technology for storing information such as computer-readable instructions, data structures, program modules, or other data. The communication media may typically include computer-readable instructions, data structures, program modules, or other data of a modulated data signal such as a carrier wave, or other transmission mechanism, and may also include information transmission media.

Furthermore, in the present specification, a "portion" may be a hardware component such as a processor or circuit, and/or a software component executed by the hardware component such as a processor.

The above descriptions of the disclosure is for an example, and it will be understood that one of ordinary skill in the art to which the disclosure pertains can easily modify the disclosure into other detailed form without changing the technical concept or essential features of the disclosure. Thus, the above-described embodiments are exemplary in all aspects and should not be for purposes of limitation. For example, each constituent element described to be a single type may be embodied in a distributive manner. Likewise, the constituent elements described to be distributed may be embodied in a combined form.

According to the disclosure, when a positioning service is received in a GNSS shadow area by alternative satellite navigation, the amount of calculation for selecting an airborne position reference node may be reduced so that an operation processing speed may be increased.

In particular, in the disclosure, in an environment in which a large number of repeaters quickly move, as the time to select an airborne position reference node among repeaters is reduced, a user may quickly and accurately obtain position information.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of selecting an airborne position reference node, the method comprising:
   obtaining position coordinates of repeaters and position coordinate of a user;
   calculating a weight center coordinate of the repeaters by obtaining an average by adding the same component in the position coordinates of the repeaters;
   determining a plane having a vector connecting the weight center coordinate of the repeaters and the position coordinate of the user as a normal vector;
   orthographically projecting the position coordinates of the repeaters onto the plane; and
   selecting a certain number of repeaters located farthest from the weight center coordinate of the repeaters to be airborne position reference nodes, on the basis of the orthographically projected coordinates of the repeaters and the weight center coordinate of the repeaters,
   wherein the selecting the certain number of the repeaters located farthest from the weight center coordinate of the repeaters to be the airborne position reference nodes comprises:
   setting a plurality of direction vectors on the plane to divide the plane into a plurality of sections;
   determining a section to which each of the repeaters belongs by performing outer product on the plurality of direction vectors adjacent to each other; and
   selecting, in each of the plurality of sections, the certain number of repeaters located farthest from the weight center coordinate of the repeaters to be the airborne position reference nodes, on the basis of the orthographically projected coordinates of the repeaters and the weight center coordinate of the repeaters.

2. The method of claim 1, wherein the selecting the certain number of the repeaters located farthest from the weight center coordinate of the repeaters to be the airborne position reference nodes comprises selecting, in each of the plurality of sections, the certain number of repeaters located farthest from the weight center coordinate of the repeaters to be airborne position reference nodes, on the basis of the coordinates of the repeaters before the orthographic projection and the weight center coordinate of the repeaters.

3. The method of claim 1, wherein the selecting the certain number of the repeaters located farthest from the weight center coordinate of the repeaters to be the airborne position reference nodes comprises selecting four repeaters located farthest from the weight center coordinate of the repeaters to be airborne position reference nodes.

4. The method of claim 1, wherein the setting of the plurality of direction vectors comprises setting four direction vectors on the plane to divide the plane into quadrants.

5. The method of claim 1, wherein the setting of the plurality of direction vectors comprises:
   setting a reference point on the plane and setting a reference direction vector connecting the weight center coordinate of the repeaters and the reference point;
   obtaining (number of sections−1) additional direction vectors by rotating the reference direction vector around the weight center coordinate of the repeaters as an axis, by $2\pi/$(number of sections) each; and
   setting the reference direction vector and the additional direction vectors to be the plurality of direction vectors on the plane.

6. The method of claim 1, wherein the calculating of the weight center coordinate comprises setting the weight center coordinate to be the origin.

7. An apparatus for selecting an airborne position reference node, the apparatus comprising:
   a communicator configured to receive position coordinates of repeaters and a position coordinate of a user; and
   a controller configured to calculate a weight center coordinate of the repeaters by obtaining an average by adding the same component in the position coordinates of repeaters,
   determine a plane having a vector connecting the weight center coordinate of the repeaters and the position coordinate of a user as a normal vector,
   orthographically project the position coordinates of the repeaters onto the plane,
   select a certain number of repeaters located farthest from the weight center coordinate of the repeaters to be airborne position reference nodes, on the basis of the orthographically projected coordinates of the repeaters and the weight center coordinate of the repeaters,
   set a plurality of direction vectors on the plane to divide the plane into a plurality of sections,
   determine a section to which each of the repeaters belongs by performing outer product on the plurality of direction vectors adjacent to each other, and
   select, in each of a plurality of sections, a certain number of repeaters located farthest from the weight center coordinate of the repeaters to be airborne position reference nodes, on the basis of the orthographically projected coordinates of the repeaters and the weight center coordinate of the repeaters.

8. The apparatus of claim 7, wherein the controller is further configured to select, in each of a plurality of sections, a certain number of repeaters located farthest from the weight center coordinate of the repeaters to be airborne position reference nodes, on the basis of the coordinates of the repeaters before the orthographic projection and the weight center coordinate of the repeaters.

9. The apparatus of claim 7, wherein the controller is further configured to select four repeaters located farthest from the weight center coordinate of the repeaters to be airborne position reference nodes.

10. The apparatus of claim 7, wherein the controller is further configured to set four direction vectors on the plane to divide the plane into quadrants.

11. The apparatus of claim 7, wherein the controller is further configured to
- set a reference point on the plane and set a reference direction vector connecting the weight center coordinate of the repeaters and the reference point;
- obtain (number of sections−1) additional direction vectors by rotating the reference direction vector around the weight center coordinate of the repeaters as an axis, by $2\pi/$(number of sections) each; and
- set the reference direction vector and the additional direction vectors to be the plurality of direction vectors on the plane.

12. The apparatus of claim 7, wherein the controller is further configured to set the weight center coordinate to be the origin.

13. A non-transitory computer-readable recording medium having recorded thereon a program for executing, on a computer, the method defined in claim 1.

\* \* \* \* \*